(12) United States Patent
Takano et al.

(10) Patent No.: US 11,823,839 B2
(45) Date of Patent: Nov. 21, 2023

(54) ELECTRONIC COMPONENT

(71) Applicant: TDK CORPORATION, Tokyo (JP)

(72) Inventors: Kosuke Takano, Tokyo (JP); Toshihiko Kaneko, Tokyo (JP); Nobuto Morigasaki, Tokyo (JP); Yasushi Kawashima, Tokyo (JP); Momoyo Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 30 days.

(21) Appl. No.: 17/569,617

(22) Filed: Jan. 6, 2022

(65) Prior Publication Data

US 2022/0246354 A1     Aug. 4, 2022

(30) Foreign Application Priority Data

Jan. 29, 2021  (JP) ................................. 2021-013048

(51) Int. Cl.
*H01G 4/232*  (2006.01)
*H01G 4/12*   (2006.01)
*H01G 4/30*   (2006.01)
*H01G 4/012*  (2006.01)

(52) U.S. Cl.
CPC ............ *H01G 4/232* (2013.01); *H01G 4/012* (2013.01); *H01G 4/12* (2013.01); *H01G 4/30* (2013.01)

(58) Field of Classification Search
CPC .......... H01G 4/232; H01G 4/012; H01G 4/12; H01G 4/30
See application file for complete search history.

(56) References Cited

U.S. PATENT DOCUMENTS

| | | | | |
|---|---|---|---|---|
| 5,196,251 A | * | 3/1993 | Bakhru | ............. H01L 23/49811 428/209 |
| 2003/0159281 A1 | * | 8/2003 | Kagohashi | ........... H01G 4/0085 29/852 |
| 2013/0258551 A1 | * | 10/2013 | Kim | ......................... H01G 4/12 977/773 |
| 2014/0126109 A1 | * | 5/2014 | Kim | ....................... H01G 4/012 264/618 |
| 2019/0304687 A1 | | 10/2019 | Iguchi | |

FOREIGN PATENT DOCUMENTS

| | | |
|---|---|---|
| CN | 110310826 A | 10/2019 |
| JP | 2010-105904 A | 5/2010 |

\* cited by examiner

*Primary Examiner* — Michael P McFadden
(74) *Attorney, Agent, or Firm* — Oliff PLC (57) ABSTRACT

An electronic component includes an element body having a functional layer and an internal electrode layer, and an external electrode formed on a surface of the element body and connected to the internal electrode layer electrically. The chlorine concentration of the element body of the electronic component is 10 ppm or less.

8 Claims, 4 Drawing Sheets

| | | |
|---|---|---|
| Example 1 |  |  |
| Comparative Example 1 |  |  |

ELECTRONIC COMPONENT

BACKGROUND OF THE INVENTION

The present invention relates to an electronic component.

Electronic equipment includes various and multiple electronic components for constituting an information processing circuit, a signal conversion circuit, a power circuit, and other circuits. A known electronic component among such electronic components is a multilayer electronic component in which functional layers that demonstrate a feature of the electronic component and electrode layers that electrically connect to terminals are laminated.

Along with a growing demand for higher performance of electronic equipment, a demand for higher performance of the materials constituting the functional layers of an electronic component in the electronic equipment has also been increasing.

Patent Literature 1 mentioned below discloses the reduction of impurities in a raw material of barium titanate used for dielectric layers of a multilayer capacitor, an example of the electronic component, to prevent the properties of the electronic component from being impaired.

Patent Literature 1: Japanese Unexamined Patent Application Publication No. 2010-105904

Only reducing impurities in the raw material of the dielectric layer may not sufficiently prevent the properties of the electronic component from being impaired.

BRIEF SUMMARY OF THE INVENTION

The present invention has been achieved under such circumstances. It is an object of the invention to provide an electronic component having a low short circuit failure rate, high reliability, and long Highly Accelerated Lifetime Test.

The inventors of the present invention have found that chlorine included in a functional layer of an electronic component impairs the properties of the electronic component. The inventors have also found that chlorine in the functional layer of the electronic component impairs the properties of the electronic component to a greater degree when chlorine originates from an inhibitor in the raw material for forming the electrode layer than when chlorine originates from the raw material of the material constituting the functional layer.

Based on these findings, an electronic component according to the present invention is as follows.

(1) An electronic component, comprising:
  an element body including a functional layer and an internal electrode layer; and
  an external electrode formed on a surface of the element body and connected to
  the internal electrode layer electrically, wherein
  the chlorine concentration of the element body is 10 ppm or less.
(2) The electronic component according to (1), wherein
  the element body includes an inner-layer dielectric layers-region where the functional layer and the internal electrode layer are laminated alternately, and an outer-layer-region located on at least one end surface of the inner-layer dielectric layers-region in a direction in which the functional layer and the internal electrode layer are laminated; and
  the chlorine concentration of the functional layer in the inner-layer dielectric layers-region is 10 ppm or less.
(3) The electronic component according to (1) or (2), wherein the internal electrode layer includes a conductive material containing at least one element selected from the group consisting of nickel and copper.
(4) The electronic component according to (1), (2), or (3), wherein the element body is obtained by using a raw material containing an inhibitor with a chlorine concentration of 50 ppm or less.
(5) The electronic component according to (4), wherein the average particle diameter of the inhibitor is 100 nm or smaller.
(6) The electronic component according to the (4) or (5), wherein a composition of the inhibitor is the same as a composition of a main component of the functional layer.

The present disclosure enables the provision of an electronic component having a low short circuit failure rate, high reliability, and long Highly Accelerated Lifetime Test.

DETAILED DESCRIPTION OF THE INVENTION

Hereinafter, the present invention is explained in detail based on a specific embodiment.

An electronic component according to the present embodiment is a multilayer electronic component with functional layers demonstrating a function of the electronic component laminated alternately with electrode layers. Examples of the multilayer electronic component include a multilayer capacitor, a multilayer varistor, a multilayer thermistor, a multilayer piezoelectric element, and a multilayer inductor, depending on the properties of the functional layers. Explanation of the multilayer capacitor is provided below as an example of the multilayer electronic component.

Figure 1:
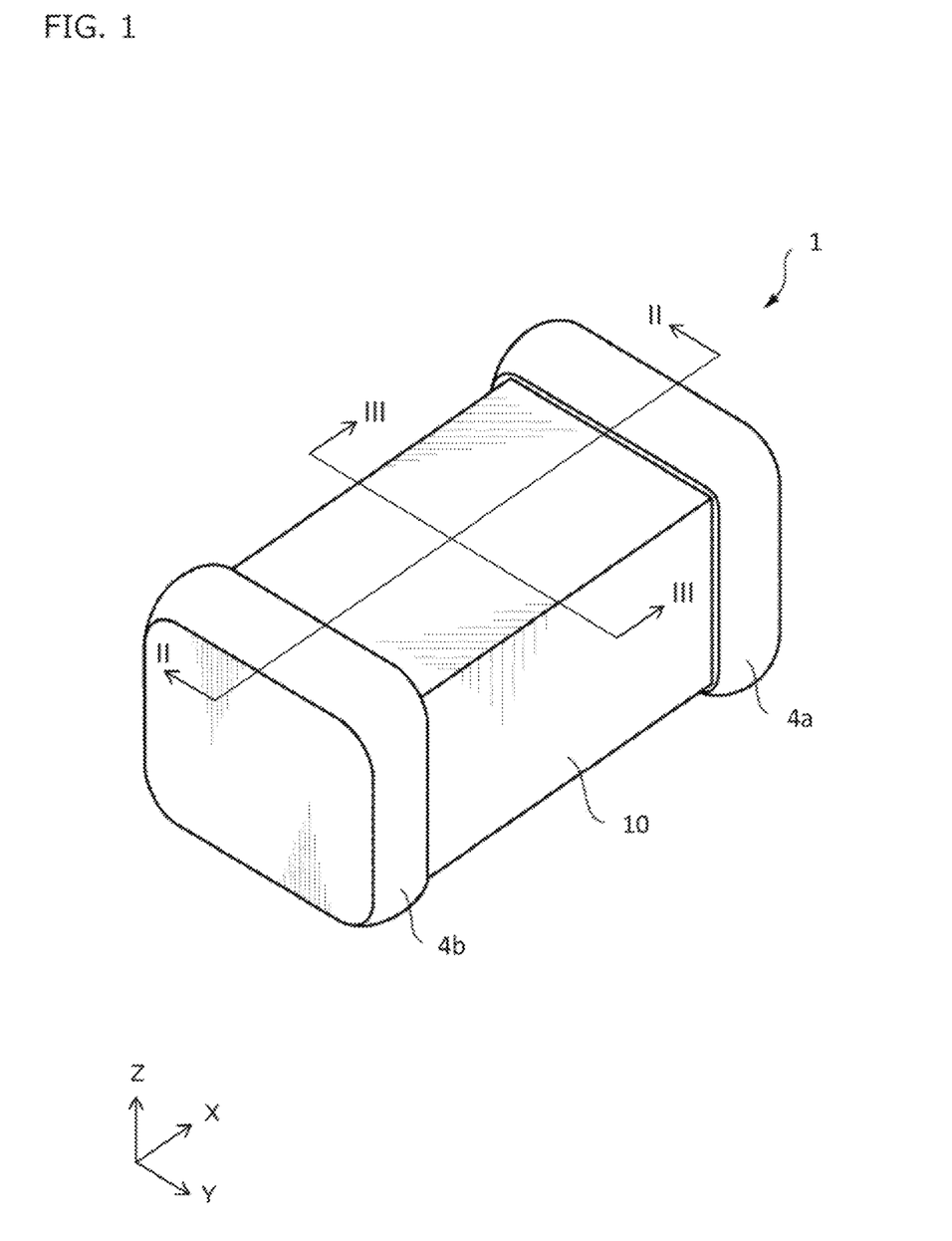
FIG. 1 is a schematic perspective view of a multilayer capacitor as an example of an electronic component according to the present embodiment.

FIG. 1 is a perspective view of the multilayer capacitor. The X axis, the Y axis, and the Z axis in FIG. 1 are perpendicular to each other. The multilayer capacitor 1 includes an element body 10 and external electrodes 4a and 4b, which are formed perpendicular to the X axis at both ends of the element body 10.

Figure 2:
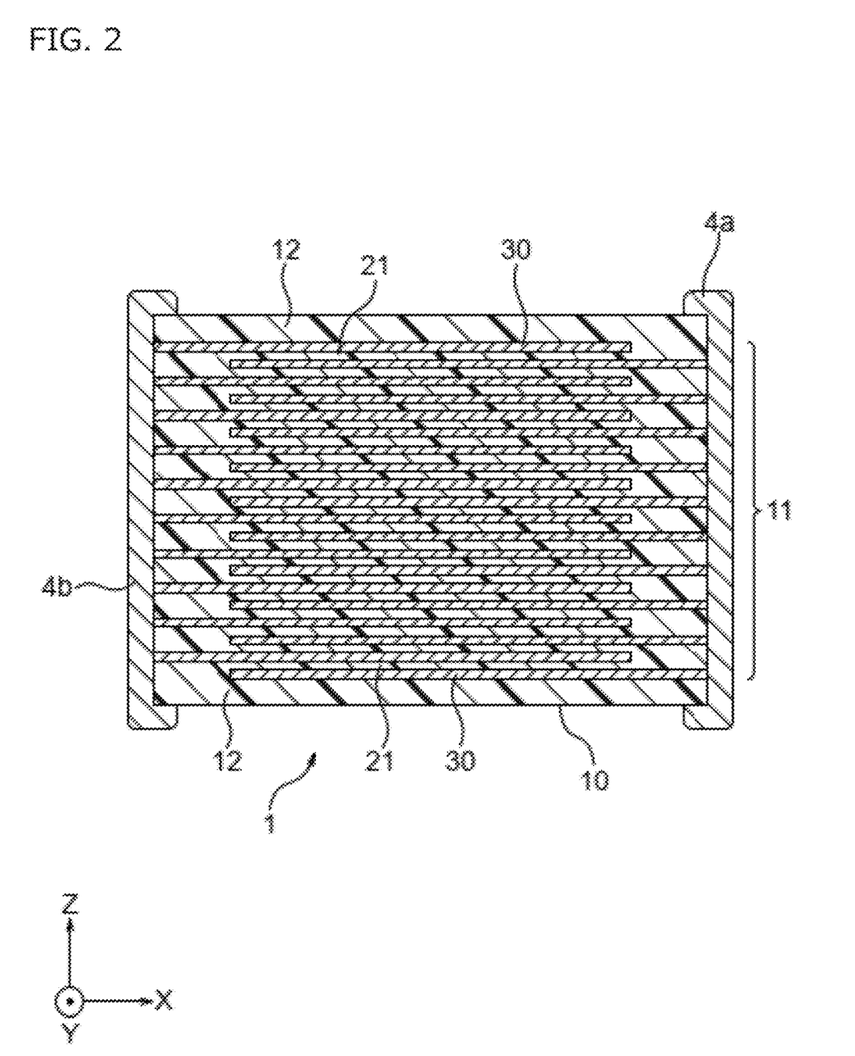
FIG. 2 is a schematic diagram showing a cross-section of the multilayer capacitor along the line II-II in FIG. 1.
Figure 3:
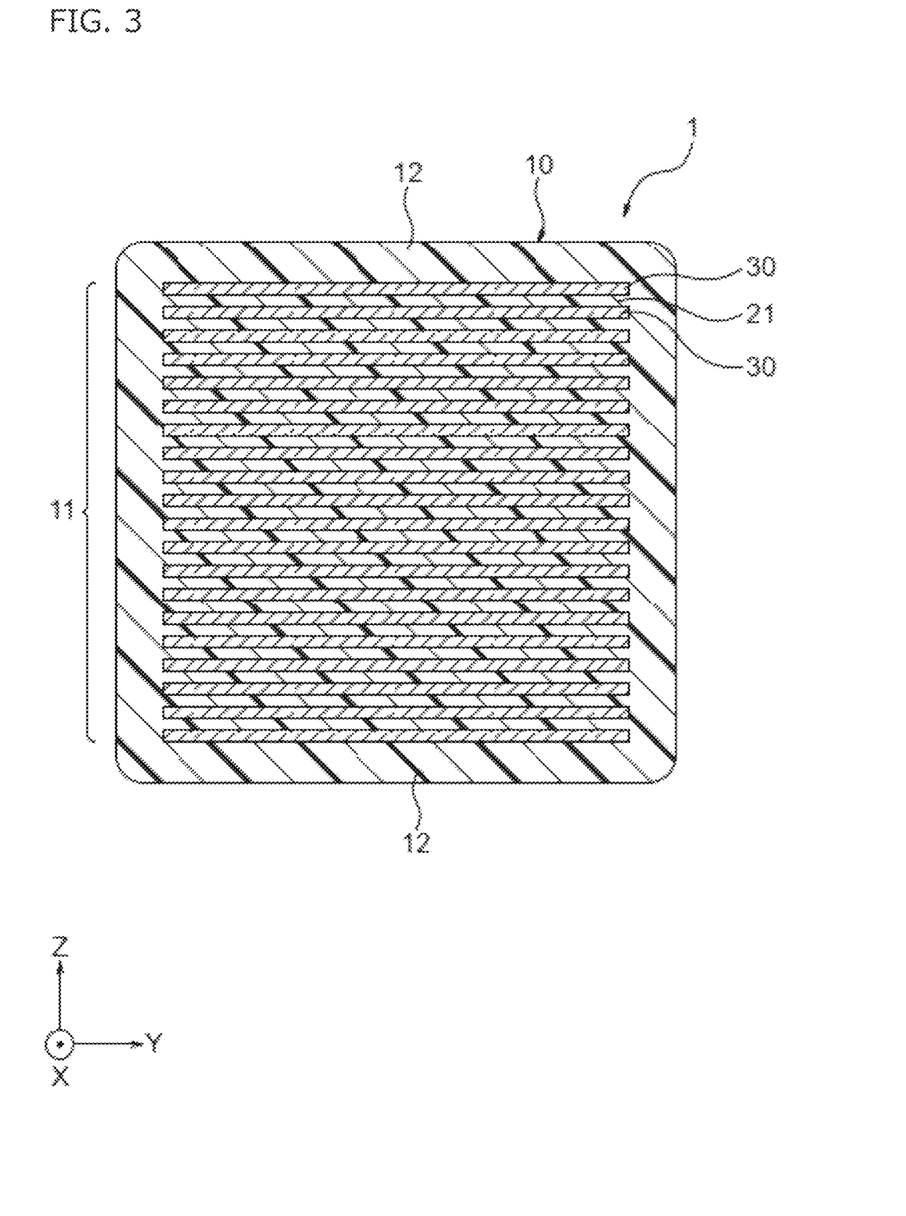
FIG. 3 is a schematic diagram showing a cross-section of the multilayer capacitor along the line in FIG. 1.

FIG. 2 shows a cross-section of the multilayer capacitor 1 along the line II-II in FIG. 1, and FIG. 3 shows a cross-section of the multilayer capacitor 1 along the line in FIG. 1.

As shown in FIGS. 2 and 3, the element body 10 includes dielectric layers 21 containing a dielectric that exhibits dielectric properties, and internal electrode layers 30 containing a conductive material. The element body 10 also includes an inner-layer dielectric layers-region 11 and outer-layer-regions 12.

As shown in FIGS. 2 and 3, the inner-layer dielectric layers-region 11 is a region where the dielectric layers (inner dielectric layers) 21 and the internal electrode layers 30 in this region are laminated alternately. The outer-layer-regions 12 are regions perpendicular to the Z axis at both end surfaces of the inner-layer dielectric layers-region 11.

The thickness of each of the inner dielectric layers 21 is determined appropriately based on usage or so, and is normally about 0.5-20 μm. The number of the inner dielectric layers 21 is normally about 2-1000.

The outer-layer-regions 12 include outer dielectric layers in the present embodiment. The internal electrode layers 30 are not formed in the outer-layer-regions 12 in the present embodiment. The outer dielectric layers are normally thicker than the inner dielectric layers constituting the inner-layer dielectric layers-region 11. Hereinafter, the inner dielectric layers and the outer dielectric layers may be collectively referred to as dielectric layers.

The internal electrode layers 30 are laminated so that their ends are alternately exposed to the two end surfaces of the element body 10 facing each other. In other words, the internal electrode layers 30 that are led out to the end surface of the element body 10 along the X axis in the positive direction to connect with the external electrode 4a electrically, and the internal electrode layers 30 that are led out to the end surface of the element body 10 along the X axis in the negative direction to connect with the external electrode 4b electrically, are laminated alternately. The thickness of each internal electrode layer 30 is determined appropriately based on usage or so.

The conductive material included in the internal electrode layers 30 preferably includes at least one element selected from the group consisting of nickel (Ni) and copper (Cu) in the present embodiment. Specifically, the conductive material preferably includes at least one selected from the group consisting of nickel, a nickel-based alloy, copper, and a copper-based alloy.

A nickel-based alloy is an alloy whose main component includes nickel. Some alloying elements are manganese (Mn), chromium (Cr), cobalt (Co), and aluminum (Al). The proportion of nickel in the nickel-based alloy is preferably at least 95 mass %.

A copper-based alloy is an alloy whose main component includes copper. A known copper alloy is permissible.

The chlorine concentration in 100 mass % of the element body is 10 ppm or less in the present embodiment. Reducing the amount of chlorine in the element body enhances properties (short circuit failure rate, reliability, and Highly Accelerated Lifetime Test) of the electronic component. The chlorine concentration affects the properties of the electronic component in accordance with the following mechanism, for example.

The element body constituting the electronic component according to the present embodiment is manufactured by forming a green chip using a paste including a binder and raw materials of the dielectric layers as functional layers (a dielectric layer paste) and a paste including a binder and raw materials of the internal electrode layers (an internal electrode layer paste), and then heating the green chip (e.g., binder removal treatment and firing).

To make the sintering shrinkage of the raw materials of the internal electrode layers more like that of the raw materials of the dielectric layers and/or to enhance the adhesion between the dielectric layers and the internal electrode layers, fine particles called an inhibitor, as well as the binder and the raw materials of the internal electrode layers, is normally added to the internal electrode layer paste.

The inventors of the present invention have found that, chlorine in the inhibitor remain in the internal electrode layer paste, the green chip, and the sintered body (element body) obtained after the green chip is fired, negatively impacting the properties (short circuit failure rate, reliability, and Highly Accelerated Lifetime Test) of the electronic component.

The inhibitor, as well as the raw materials (e.g., conductive material powder) of the internal electrode layers, is fixed through the binder in the green chip. However, because the binder is not present after the binder removal treatment of the green chip, the inhibitor and the conductive material come in contact with each other more easily. It is assumed that, contact between the inhibitor and the conductive material tends to cause a reaction between chlorine in the inhibitor and the conductive material (metal) to form chloride at the time of the binder removal treatment or firing. It is also assumed that the chloride is likely to diffuse from the internal electrode layers to the dielectric layers when the green chip is fired. As a result, it is assumed that, the chloride may be solid-soluted into some of the dielectric particles in the element body after firing, or, the chloride may be deoxidized in the reducing atmosphere upon firing and metalize to become a hetero-phase in the element body after firing.

Such particles and such hetero-phase cause the dielectric layers to become more likely to have electrical conductivity, thus increasing the short circuit failure rate and reducing the reliability and the lifetime of the electronic component. The negative impact on the properties of the electronic component is large especially when the chloride is a nickel chloride or a copper chloride.

Compared with chlorine in the inhibitor, chlorine in the raw materials (dielectric powder) of the dielectric layers is farther from the internal electrode layers. It is assumed that this makes chlorine in the dielectric powder less likely to react with the conductive material (metal) to form chloride at the time of the binder removal treatment and firing of the green chip. Alternatively, chlorine in the dielectric powder may be volatilized before chloride is formed. As a result, it is assumed that the negative impact on the properties of the electronic component caused by chlorine in the dielectric powder is smaller than that caused by chlorine in the inhibitor.

While the inhibitor is likely to move around upon firing and is present in the dielectric layers near the internal electrode layers in the element body, chlorine goes away from the inhibitor and diffuses inside the dielectric particles in the dielectric layers. Accordingly, in the dielectric particles, it is difficult to distinguish between chlorine attributable to the inhibitor and chlorine attributable to the raw materials of the dielectric.

Chlorine being a light element, it is difficult to measure the chlorine concentration and distribution in the dielectric layers precisely using a normal element analysis method (e.g., EPMA, EDS). It is therefore difficult to determine whether the chlorine concentration of the element body is within or out of the range mentioned above based on the results of the analysis using a normal element analysis method, when the chlorine concentration is close to the upper limit mentioned above. Thus, the chlorine concentration of the element body is measured using the following method in the present embodiment.

If the external electrodes are formed on the element body after firing, the external electrodes are first removed, and then only the element body is pulverized. The pulverized material is put into a container, placed in a furnace where steam is introduced, and held there at a temperature of 1000° C. Chlorine in the pulverized material then evaporates. The evaporated chlorine, as well as steam, is then withdrawn and cooled to be collected as a chloride ion aqueous solution. The collected chloride ion aqueous solution undergoes a quantitative analysis using ion chromatography (IC) or ICP to measure the chlorine concentration in 100 mass % of the element body. IC is preferably used in the analysis when the concentration of the chloride ion is expected to be low, and ICP is preferably used in the analysis when the concentration of the chloride ion is expected to be high.

As described above, chlorine is present in the dielectric particles between the internal electrode layers in the fired element body. In the present embodiment, the chlorine concentration in the areas excluding the internal electrode layers and the dielectric layers (the outer-layer-region) not sandwiched between the internal electrode layers in the element body is preferably 10 ppm or less. In short, the chlorine concentration is preferably 10 ppm or less in 100 mass % of the inner dielectric layers.

A method of measuring the chlorine concentration of the inner dielectric layers is the same as the method of measuring the chlorine concentration of the element body. Specifically, the outer-layer-regions are removed by polishing, and the internal electrode layers are dissolved with acid for removal, in order to obtain only the inner dielectric layers from the element body. The method mentioned above is then used. Chlorine in the inner dielectric layers evaporates, and the evaporated chlorine, as well as steam, is withdrawn so that a chloride ion aqueous solution is obtained. The chloride ion aqueous solution is collected and then undergoes a quantitative analysis using ion chromatography (IC) or ICP to measure the chlorine concentration in 100 mass % of the inner dielectric layers. IC is preferably used in the analysis when the concentration of the chloride ion is expected to be low, and ICP is preferably used in the analysis when the concentration of the chloride ion is expected to be high.

Any inhibitor may be used as long as the inhibitor can make the sintering shrinkage of the raw materials of the internal electrode layers more like that of the raw materials of the dielectric layers and/or can enhance the adhesion between the dielectric layers and the internal electrode layers. Ceramic particles are suitably used as the inhibitor in the present embodiment. In particular, ceramic particles with a composition same as or similar to the composition of the dielectric constituting the dielectric layers are preferably used as the inhibitor. Specifically, ceramic particles having the composition same as that of the dielectric, the main component, contained in the dielectric layers are preferably used as the inhibitor.

The average particle diameter of the inhibitor is preferably smaller than that of the dielectric powder. The average particle diameter of the inhibitor is 100 nm or smaller, and preferably 50 nm or smaller, in the present embodiment.

As described above, chlorine in the element body is mainly attributable to the inhibitor. Thus, to limit the chlorine concentration of the element body to the above-mentioned value or below, the amount of chlorine in the inhibitor is reduced.

One method of reducing the amount of chlorine in the inhibitor is to clean the inhibitor with water. Because chlorine dissolves in water, cleaning the inhibitor with water causes chlorine in the inhibitor to dissolve in water. This reduces the chlorine concentration of the inhibitor compared with the chlorine concentration before cleaning.

When the inhibitor is comprised of ceramic particles, the inhibitor is normally comprised of a complex oxide containing multiple metal elements. Such a complex oxide is synthesized by mixing multiple metal compounds and heating them. Using metal compounds with low chlorine concentration as the raw materials of the complex oxide thus reduces the chlorine concentration of the inhibitor.

The chlorine concentration of the inhibitor can also be reduced by cleaning metal compounds having a high chlorine concentration with water to lower the chlorine concentration, and using these metal compounds as the raw materials of the complex oxide.

The chlorine concentration of the inhibitor is preferably 50 ppm or less in the present embodiment. The chlorine concentration of the inhibitor is measured in an analysis using IC. IC is preferably used when the chlorine concentration is expected to be low, and ICP is preferably used when the chlorine concentration is expected to be high.

The main component of the dielectric layers includes the dielectric having a perovskite structure, a tungsten bronze structure, and the like. An example of the dielectric having the perovskite structure is a compound represented by a chemical formula $ABO_3$. In $ABO_3$, A is an element occupying the A-site of the perovskite structure, and includes at least one element selected from the group consisting of barium (Ba), calcium (Ca), strontium (Sr), and the like. In $ABO_3$, B is an element occupying the B-site of the perovskite structure, and includes at least one element selected from the group consisting of titanium (Ti), zirconium (Zr), and the like. The molar ratio of A to B (AB) is, for example, 0.980-1.020.

As described above, the inhibitor preferably has a composition same as that of the main component of the dielectric layers.

The dielectric layers may further include a subcomponent in addition to the above main component. An element of the subcomponent and the amount of the subcomponent may be determined based on desired properties. Examples of the subcomponent include one or more oxides of at least one element selected from the group consisting of manganese (Mn), chromium (Cr), cobalt (Co), nickel (Ni), and iron (Fe); one or more oxides of at least one element selected from the group consisting of vanadium (V), molybdenum (Mo), and tungsten (W); one or more oxides of at least one rare earth element; oxide of magnesium (Mg); and one or more oxides of at least one element selected from the group consisting of silicon (Si), lithium (Li), aluminum (Al), germanium (Ge), barium (Ba), calcium (Ca), and boron (B).

The inhibitor preferably has a composition same as that of the main component of the dielectric layers, when the subcomponent, in addition to the main component, is included in the dielectric layers. In other words, when the dielectric layers include both the main component and the subcomponent, ceramic particles having a composition similar to that of the dielectric in the dielectric layers are preferably used as the inhibitor. The amount of the inhibitor is preferably 10 parts by mass to 20 parts by mass with respect to 100 parts by mass of the conductive material.

The material of the inner dielectric layers and the material of the outer dielectric layers may be the same or may be different.

As a method of manufacturing the electronic component according to the present embodiment, a method of manufacturing the multilayer capacitor 1 is explained next. In the present embodiment, the multilayer capacitor 1 is manufactured in the same manner as a conventional multilayer capacitor is manufactured. The multilayer capacitor 1 is manufactured by forming a green chip with a normal printing or sheet method using pastes, firing the green chip, and baking the fired chip after printing or transferring external electrodes onto the fired chip. Details of the manufacturing method are explained below.

A paste for forming the dielectric layers (the dielectric layer paste) is first prepared. If the material of the inner dielectric layers and the material of the outer dielectric layers are different, a paste for forming the inner dielectric layers (an inner dielectric layer paste) and a paste for forming the outer dielectric layers (an outer dielectric layer paste) are both prepared. The dielectric layer pastes are normally comprised of an aqueous paste, or an organic solvent paste obtained by kneading a raw material powder of the dielectric and an organic vehicle together.

The raw material powder of the dielectric may be appropriately selected from various compounds that become oxides or complex oxides, including carbonate, nitrate, hydroxide, and organic metal compounds. The selected compounds may be mixed together to be used. The average particle diameter of the raw material powder of the dielectric is preferably 200 nm or smaller, and more preferably about 100-200 nm, in the present embodiment.

The organic vehicle is made of an organic solvent in which a binder is dissolved. The binder used for the organic vehicle is not limited and may be appropriately selected from various normal binders, such as ethyl cellulose and polyvinyl butyral. The organic solvent is also not limited and may be appropriately selected from various organic solvents, such as acetone and toluene.

A paste for forming the internal electrode layers (the internal electrode layer paste) is prepared next. The internal electrode layer paste is prepared by kneading the above organic vehicle, the inhibitor whose chlorine concentration is reduced using the above-mentioned method, and the above-mentioned conductive material or the compounds that become the above-mentioned conductive material after firing (e.g., compounds, such as oxide, an organic metal compound, and a resinate).

A paste for forming the external electrodes (an external electrode paste) may be prepared in the same manner as the above-mentioned internal electrode layer paste is prepared, except that the external electrode paste does not include the inhibitor.

The amount of the organic vehicle in each paste is not limited, and may be about 1-5 mass % for the binder and about 10-50 mass % for the solvent, for example (normal amount). Each paste may additionally include additives selected from a dispersant, a plasticizer, a dielectric, an insulator, and the like, as necessary. The total amount of the additives is preferably 10 mass % or less.

When the printing method is used, the green chip is obtained by printing the dielectric layer pastes (the inner dielectric layer paste and the outer dielectric layer paste) and the internal electrode layer paste on a substrate made of PET or the like, laminating the printed layers, cutting them into predetermined dimensions, and then peeling the cut pieces off from the substrate. When the sheet method is used, the green chip is obtained by forming a green sheet with the dielectric layer pastes (the inner dielectric layer paste and the outer dielectric layer paste), printing the internal electrode layer paste on the green sheet to form an internal electrode pattern, and then laminating a plurality of such green sheets.

The green chip undergoes the binder removal treatment before being fired. As for the binder removal treatment, the heating rate is preferably 5-300° C./hour, the holding temperature is preferably 180-400° C., and the temperature holding time is preferably 0.5-24 hours. The binder removal treatment atmosphere is air or the reducing atmosphere.

After the binder removal treatment, the green chip is fired. The heating rate upon firing is preferably 100-500° C./hour.

The holding temperature upon firing is preferably 1300° C. or lower, and more preferably 1150-1280° C. The holding time is preferably 0.5-8 hours, and more preferably 2-3 hours. If the holding temperature is lower than the lower limit of the above range, the sintered body might not be densified sufficiently. If the holding temperature exceeds the upper limit of the above range, electrode disconnection due to abnormal sintering of the internal electrode layers, deterioration of the capacitance-temperature characteristic due to diffusion of the conductive material contained in the internal electrode layers, and reduction of the dielectric become more likely to occur.

The firing atmosphere is preferably the reducing atmosphere. The atmosphere gas may be a humidified $N_2$ and $H_2$ mixed gas, for example.

The oxygen partial pressure upon firing may be appropriately determined in accordance with the type of the conductive material in the internal electrode layer paste. If the conductive material is a base metal, such as Ni and a Ni-based alloy, the oxygen partial pressure of the firing atmosphere is preferably $10^{-14}$ to $10^{-10}$ MPa. If the oxygen partial pressure is below the lower limit of the above range, abnormal sintering of the conductive material in the internal electrode layers may occur to cause electrode disconnection. If the oxygen partial pressure exceeds the upper limit of the above range, the internal electrode layers tend to oxidize. The cooling rate is preferably 50 to 500° C./hour.

The element body preferably undergoes an annealing treatment after being fired in the reducing atmosphere. The annealing treatment, in which the dielectric layers are reoxidized, enables remarkable prolongation of IR life (insulation resistance life).

The oxygen partial pressure in the annealing atmosphere is preferably $10^{-9}$ to $10^{-5}$ MPa. If the oxygen partial pressure is below the lower limit of the above range, it is difficult for the dielectric layers to reoxidize. If the oxygen partial pressure exceeds the upper limit of the above range, the internal electrode layers tend to oxidize too much.

The holding temperature during annealing is preferably 1100° C. or lower, and particularly preferably 1000-1100° C. If the holding temperature is below the lower limit of the range, the dielectric layers do not oxidize sufficiently, possibly lowering IR and curtailing the IR life. If the holding temperature exceeds the upper limit of the above range, capacitance is more likely to be reduced due to oxidation of the internal electrode layers. The annealing treatment may be comprised of only the heating and cooling processes. This means that the temperature holding time may be zero, in which case the holding temperature is the same as the maximum temperature at which cooling starts.

As for the annealing treatment, the temperature holding time is preferably 0-20 hours, and more preferably 2-4 hours, and the cooling rate is preferably 50-500° C./hour, and more preferably 100-300° C./hour. The annealing atmosphere gas is, for example, preferably a humidified $N_2$ gas or the like.

A wetter, for example, may be used to humidify the $N_2$ gas, the mixed gas, etc. in the above binder removal treatment, firing, and annealing. In such a case, the water temperature is preferably about 5-75° C.

The binder removal treatment, firing, and annealing may be performed consecutively or independently.

The end surfaces of the element body obtained in the above-mentioned manner are polished with barrel polishing, sandblasting, or the like. The external electrode paste is applied to this element body and baked to form the external electrodes. A coverage layer may be formed on the surfaces of the external electrodes by plating or so as necessary.

The multilayer capacitor thus manufactured as an example of the electronic component according to the present embodiment is mounted on a printed circuit board or the like with soldering or other methods in various items of electronic equipment.

Although the embodiment according to the present invention has been explained above, the present invention is not at all limited to the above embodiment. The present invention may be put into practice in various forms without departing from the scope of the invention.

EXAMPLES

Hereinafter, the present invention is explained in further detail with examples and comparative examples, but is not limited to the following examples.

Experiment 1

A powder of barium titanate with an average particle diameter of 200 nm was prepared first as the raw material powder of the main component of the dielectric layers. The chlorine concentration was 50 ppm in 100 mass % of the barium titanate powder.

The raw material powders of the subcomponents were weighed and prepared to include 0.40 parts by mol of $Y_2O_3$, 0.60 parts by mol of $SiO_2$, 0.20 parts by mol of MnO, 1.70 parts by mol of MgO, and 0.05 parts by mol of $V_2O_5$ with respect to 100 parts by mol of $TiO_2$ in the above barium titanate powder. The barium titanate powder and the raw material powders of the subcomponents were wet-mixed and pulverized for 10 hours using a ball mill and then dried. The dielectric raw material was thus obtained.

100 parts by mass of the dielectric raw material, 10 parts by mass of polyvinyl butyral resin, 5 parts by mass of dioctyl phthalate (DOP) as the plasticizer, and 100 parts by mass of alcohol as the solvent were mixed in a ball mill to be made into a paste. The dielectric layer paste was thus obtained.

Then, 42.9 parts by mass of Ni particles, 6.4 parts by mass of the inhibitor, 47.6 parts by mass of terpineol, 2.7 parts by mass of ethyl cellulose, and 0.4 parts by mass of benzotriazole were kneaded using a three roller mill and made into a paste. The internal electrode layer paste was thus obtained.

In Example 1, a powder of barium titanate with an average particle diameter of 50 nm cleaned with purified water was used as an inhibitor. The chlorine concentration was 1800 ppm before cleaning with purified water and 1 ppm after cleaning with purified water, in 100 mass % of the barium titanate powder.

The dielectric layer paste prepared as above was used to form a green sheet having a thickness of 5.0 μm after being dried on a PET film. On the green sheet, an internal electrode layer was printed in a predetermined pattern using the internal electrode layer paste. The green sheet was then peeled off from the PET film. The green sheet having the internal electrode layer was thus manufactured.

A plurality of such green sheets having the internal electrode layers was laminated and adhered by pressure, forming a green laminated body. The green laminated body was then cut into a predetermined size. A green chip was thus obtained.

Next, a binder removal treatment, firing, and annealing were performed for the green chip under the following conditions. An element body was thus obtained.

As for the conditions of the binder removal treatment, the heating rate was 25° C./hour, the holding temperature was 260° C., the temperature holding time was 8 hours, and the atmosphere was air.

As for the firing conditions, the heating rate was 200° C./hour, the holding temperature was 1200° C., and the holding time was 2 hours. The cooling rate was 200° C./hour. The atmosphere gas was a humidified $N_2+H_2$ mixed gas so that the oxygen partial pressure would be $10^{12}$ MPa.

As for the annealing conditions, the heating rate was 200° C./hour, the holding temperature was 1000° C., the temperature holding time was 2 hours, the cooling rate was 200° C./hour, and the atmosphere gas was a humidified $N_2$ gas (oxygen partial pressure was $10^{-7}$ MPa).

A wetter was used for humidification of the atmosphere gas upon firing and annealing.

The chlorine concentration of the element body was measured as follows. The element body was put in an agate mortar and pulverized. The pulverized powder was then put in a ceramic combustion boat, and the ceramic combustion boat was put into a tube furnace. While steam was introduced into the tube furnace, the pulverized powder was heated to 1000° C. The steam was collected and cooled to obtain a chloride ion aqueous solution. The chloride ion aqueous solution was analyzed using ion chromatography (IC) and ICP to measure the amount of chlorine contained. The chlorine concentration of the element body was thus calculated. The results are shown in Table 1. IC was used in the analysis when the concentration of the chloride ion was expected to be low (for example, Examples), and ICP was used when the concentration of the chloride ion was expected to be high (for example, Comparative Examples).

Outer-layer-regions were removed from the element body by polishing. The element body having its outer-layer-regions removed was immersed in nitric acid to dissolve the internal electrode layers. The dielectric layers (inner dielectric layers) in an inner-layer dielectric layers-region were thus obtained. The inner dielectric layers were pulverized, and then the chlorine concentration of the inner dielectric layers was calculated using the above-mentioned method. The results are shown in Table 1.

The end surfaces of the element body were polished with sandblasting. Cu was then applied as external electrodes. A sample of a multilayer capacitor shown in FIG. 1 was thus obtained. The size of the capacitor sample was 3.2 mm×1.6 mm×0.6 mm. The thickness of the inner dielectric layers was 1 μm. The thickness of the internal electrode layers was 4.0 μm. The number of the inner dielectric layers sandwiched between the internal electrode layers was 300.

The short circuit failure rate, reliability, and Highly Accelerated Lifetime Test (HALT) of each capacitor sample were measured using the following methods.

Short Circuit Failure Rate

Resistance of each capacitor sample was measured using Digital Multimeter-CDM-2000D. The samples having a resistance of 100Ω or lower were determined as defective to find the number of the samples that resulted in a short circuit among 3000 capacitor samples. In Experiment 1, examples with zero samples resulting in a short circuit were determined as good. The results are shown in Table 1.

Reliability

A voltage application test (125° C., 20.0 V/μm) was performed for 3000 hours for each capacitor sample. Then, the samples whose insulation resistance reduced by one digit from the value at the time of starting voltage application were determined as defective to find the number of the capacitor samples having low reliability among 3000 samples. In Experiment 1, examples with zero samples having a low reliability were determined as good. The results are shown in Table 1.

Highly Accelerated Lifetime Test

While each capacitor sample was held at 180° C. with a DC voltage applied in an electric field of 20.0 V/μm, the lifetime under such circumstances was measured to evaluate the Highly Accelerated Lifetime Test. In the present example, the lifetime was defined as the time between when the voltage started to be applied and when the insulation resistance reduced by one digit from the insulation resistance at the time of starting voltage application. In the present embodiment, the above evaluation was performed for 20 capacitor samples, and the average value was defined as the Highly Accelerated Lifetime Test. In Experiment 1, examples with a Highly Accelerated Lifetime Test of 10 hours or longer were determined as good. The results are shown in Table 1.

Examples 2-4

An element body and a multilayer ceramic capacitor sample were manufactured in the same manner as in Example 1, except that the amount of time of cleaning an inhibitor with purified water was changed and the inhibitor after being cleaned with purified water had a chlorine concentration shown in Table 1. Then, the same evaluations as in Example 1 were performed. The results are shown in Table 1.

Example 5

An element body and a multilayer ceramic capacitor sample were manufactured in the same manner as in Example 1, except that an inhibitor was manufactured as follows. Then, the same evaluations as in Example 1 were performed. The results are shown in Table 1.

A raw material of barium with a chlorine concentration of 50 ppm or smaller and a raw material of titanium with a chlorine concentration of 50 ppm or smaller were mixed and fired at 1000° C. to form barium titanate. Barium titanate was then pulverized. A powder of barium titanate to be used as the inhibitor was thus obtained. The average particle diameter of the barium titanate powder was 50 nm. The chlorine concentration of the barium titanate powder was 10 ppm.

Example 6

An element body and a multilayer ceramic capacitor sample were manufactured in the same manner as in Example 1, except that an inhibitor was manufactured as follows. Then, the same evaluations as in Example 1 were performed. The results are shown in Table 1.

A raw material of barium with a chlorine concentration of over 50 ppm and a raw material of titanium with a chlorine concentration of over 50 ppm were cleaned with purified water. Thus, a raw material of barium with a chlorine concentration of 50 ppm or smaller and a raw material of titanium with a chlorine concentration of 50 ppm or smaller were obtained. The raw materials of barium and titanium were mixed and fired at 1000° C. to form barium titanate. Barium titanate was then pulverized. A powder of barium titanate to be used as the inhibitor was thus obtained. The average particle diameter of the barium titanate powder was 50 nm. The chlorine concentration of the barium titanate powder was 10 ppm.

Examples 7-10

A powder of barium titanate with an average particle diameter of 100 nm was cleaned with purified water for a predetermined time so that the inhibitor comprised of the powder had the chlorine concentration shown in Table 1. Except that this inhibitor was used, an element body and a multilayer ceramic capacitor sample were manufactured in the same manner as in Example 1, and the same evaluations as in Example 1 were performed. The results are shown in Table 1.

Comparative Example 1

An element body and a multilayer ceramic capacitor sample were manufactured in the same manner as in Example 1, except that a powder of barium titanate that was not cleaned with purified water was used as an inhibitor. Then, the same evaluations as in Example 1 were performed. The results are shown in Table 1. In short, the inhibitor used in Comparative Example 1 was the barium titanate powder before being cleaned with purified water in Example 1.

Comparative Examples 2 and 3

An element body and a multilayer ceramic capacitor sample were manufactured in the same manner as in Example 1, except that an inhibitor had an average particle diameter shown in Table 1, and was comprised of a powder of barium titanate that had the chlorine concentration shown in Table 1 and that was not cleaned with purified water. Then, the same evaluations as in Example 1 were performed. The results are shown in Table 1.

Comparative Examples 4-6

An element body and a multilayer ceramic capacitor sample were manufactured in the same manner as in Example 1, except that the amount of time of cleaning an inhibitor with purified water was changed and the inhibitor after being cleaned with purified water had a chlorine concentration shown in Table 1. Then, the same evaluations as in Example 1 were performed. The results are shown in Table 1.

TABLE 1

| | Inhibitor | | Element body | | Multilayer Capacitor | | |
|---|---|---|---|---|---|---|---|
| Examples | Average Particle Diameter [nm] | Chlorine Concentration [ppm] | Chlorine Concentration of Element Body [ppm] | Chlorine Concentration of Inner Dielectric Layers [ppm] | Short Circuit Failure Rate | Reliability 125° C.- 20 V/μm | Highly Accelerated Lifetime Test HALT 180° C.- 20 V/μm [h] |
| Example 1 | 50 | 1 | Minimum limit of determination or below | Minimum limit of determination or below | 0/3000 | 0/3000 | 12 |
| Example 2 | 50 | 10 | Minimum limit of determination or below | Minimum limit of determination or below | 0/3000 | 0/3000 | 13 |
| Example 3 | 50 | 20 | 3 | 3 | 0/3000 | 0/3000 | 11 |
| Example 4 | 50 | 50 | 10 | 10 | 0/3000 | 0/3000 | 12 |
| Example 5 | 50 | 10 | Minimum limit of detennination or below | Minimum limit of detennination or below | 0/3000 | 0/3000 | 11 |
| Example 6 | 50 | 10 | Minimum limit of determination or below | Minimum limit of determination or below | 0/3000 | 0/3000 | 13 |
| Example 7 | 100 | 1 | Minimum limit of determination or below | Minimum limit of determination or below | 0/3000 | 0/3000 | 13 |
| Example 8 | 100 | 10 | Minimum limit of determination or below | Minimum limit of determination or below | 0/3000 | 0/3000 | 12 |
| Example 9 | 100 | 20 | 2 | 2 | 0/3000 | 0/3000 | 12 |
| Example 10 | 100 | 50 | 9 | 9 | 0/3000 | 0/3000 | 12 |
| Comparative Example 1 | 50 | 1800 | 74 | 74 | 50/3000 | 226/3000 | 2 |
| Comparative Example 2 | 100 | 850 | 52 | 52 | 52/3000 | 216/3000 | 2 |
| Comparative Example 3 | 200 | 100 | 18 | 18 | 22/3000 | 75/3000 | 4 |
| Comparative Example 4 | 50 | 800 | 40 | 40 | 38/3000 | 165/3000 | 3 |
| Comparative Example 5 | 50 | 600 | 30 | 30 | 24/3000 | 81/3000 | 3 |
| Comparative Example 6 | 50 | 60 | 15 | 15 | 2/3000 | 10/3000 | 5 |

According to Table 1, when the chlorine concentration of the element body was within the above-mentioned range, the short circuit failure rate, reliability, and Highly Accelerated Lifetime Test of the sample were all good. On the other hand, when the chlorine concentration of the element body was out of the above-mentioned range, the sample at least had a short Highly Accelerated Lifetime Test.

Figure 4:
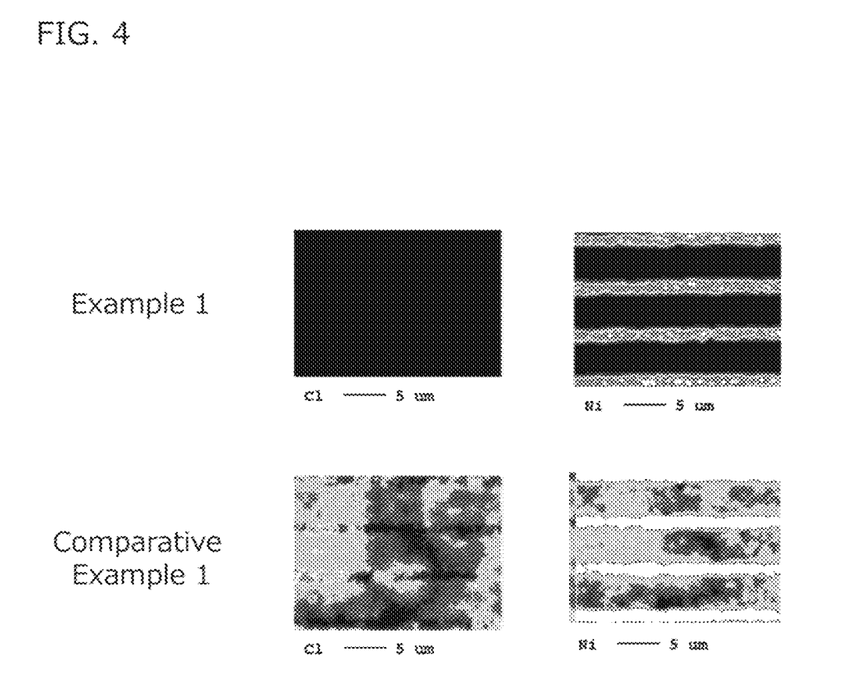
FIG. 4 is a result of mapping analysis of the samples of examples and comparative examples of the present invention using EPMA.

Samples of Example 1 and Comparative Example 1 were cut and polished. Polished cross-sections were thus obtained. Mapping analysis was performed for the polished cross-sections using an electron probe microanalyzer (EPMA). FIG. 4 shows the results of the mapping analysis of chlorine and nickel. The top left view is the mapping view of chlorine in the internal electrode layers and the dielectric layers in Example 1. The top right view is the mapping view of nickel in the same portion of Example 1. Likewise, the bottom left view is the mapping view of chlorine in Comparative Example 1, and the bottom right view is the mapping view of nickel in Comparative Example 1.

According to FIG. 4, chlorine was almost not present in the dielectric layers sandwiched between the internal electrode layers in the sample of Example 1. On the other hand, because the chlorine concentration of the inhibitor in Comparative Example 1 was extremely high, nickel chloride was present in the dielectric layers sandwiched between the internal electrode layers in Comparative Example 1, which means that chlorine was present at a high concentration in the dielectric layers between the internal electrode layers.

DESCRIPTION OF THE REFERENCE NUMERALS

1 . . . multilayer capacitor
10 . . . element body
11 . . . inner-layer dielectric layers-region
21 . . . inner dielectric layer
30 . . . internal electrode layer
12 . . . outer-layer-region
4 . . . external electrode

What is claimed is:

1. An electronic component, comprising:
an element body including a functional layer and an internal electrode layer; and
an external electrode formed on a surface of the element body and connected to the internal electrode layer electrically, wherein
the chlorine concentration of the element body is greater than 0 ppm and equal to or less than 10 ppm, and
the element body is obtained by using an internal electrode layer paste containing a barium titanate inhibitor with a chlorine concentration of 50 ppm or less.

2. The electronic component according to claim 1, wherein
the element body includes an inner-layer dielectric layers-region where the functional layer and the internal electrode layer are laminated alternately, and an outer-layer-region located on at least one end surface of the inner-layer dielectric layers-region in a direction in which the functional layer and the internal electrode layer are laminated; and the chlorine concentration of the functional layer in the inner-layer dielectric layers-region is greater than 0 ppm and equal to or less than 10 ppm.

3. The electronic component according to claim 2, wherein the internal electrode layer includes a conductive material containing at least one element selected from the group consisting of nickel and copper.

4. The electronic component according to claim 2, wherein the average particle diameter of the inhibitor is 100 nm or smaller.

5. The electronic component according to claim 2, wherein a composition of the inhibitor is the same as a composition of a main component of the functional layer.

6. The electronic component according to claim 1, wherein the internal electrode layer includes a conductive material containing at least one element selected from the group consisting of nickel and copper.

7. The electronic component according to claim 1, wherein the average particle diameter of the inhibitor is 100 nm or smaller.

8. The electronic component according to claim 1, wherein a composition of the inhibitor is the same as a composition of a main component of the functional layer.

\* \* \* \* \*